Nov. 9, 1954  H. C. OTIS  2,693,819
SAFETY CONTROL DEVICE
Filed March 16, 1950
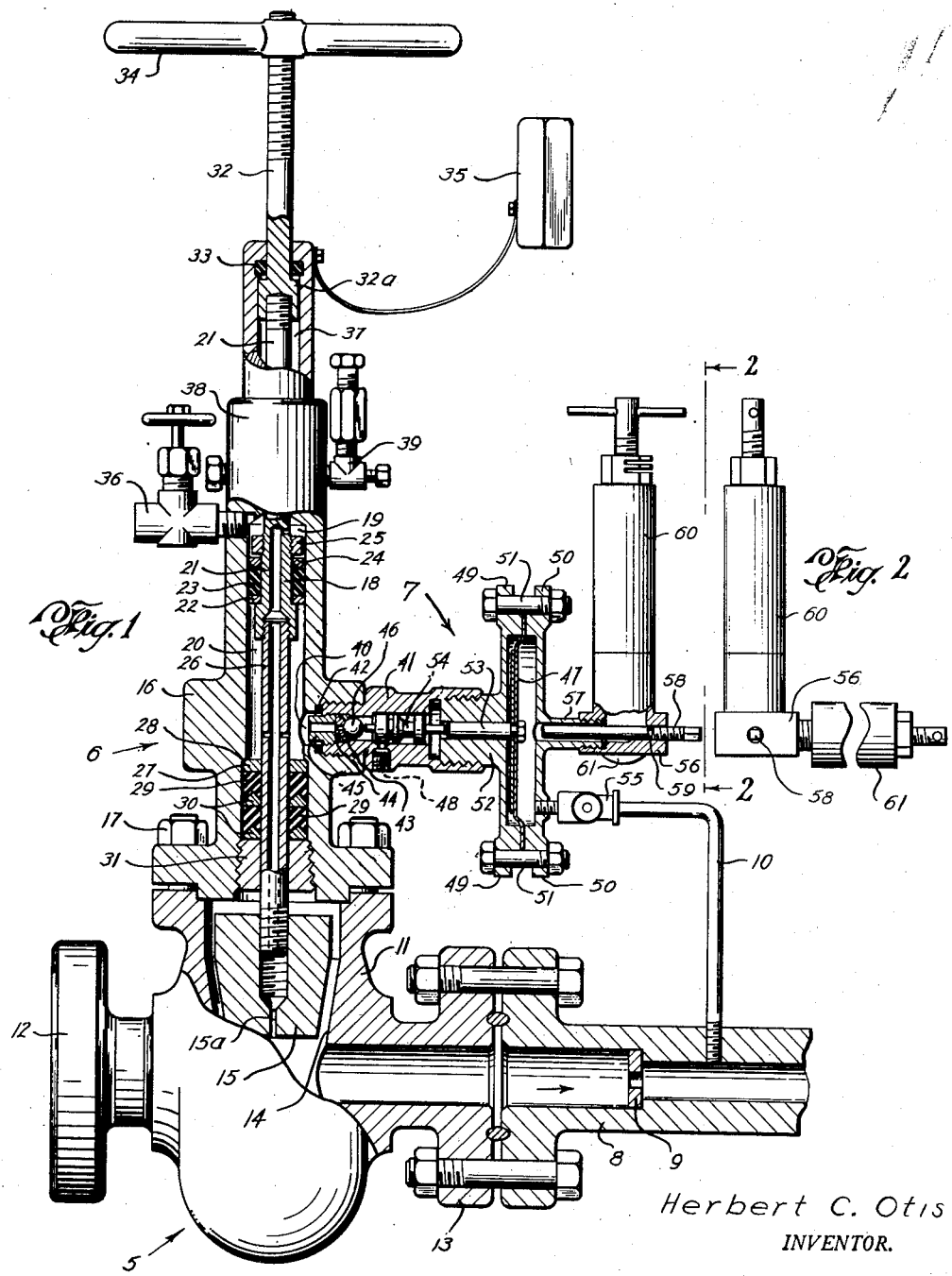
Herbert C. Otis
INVENTOR.
BY
Browning & Simms
ATTORNEYS ated Nov. 9, 1954

2,693,819

SAFETY CONTROL DEVICE

Herbert C. Otis, Dallas, Tex.

Application March 16, 1950, Serial No. 150,018

17 Claims. (Cl. 137—458)

This invention relates to improvements in safety control devices and refers more particularly to such devices adapted to shut off flow in a pipe line in the event of emergencies.

In handling and transporting fluid under high pressures in pipe lines, it is desirable to shut off the pipe lines during emergencies; for instance, in the event of a blowout or break in the line downstream from the safety device or the plugging of the line caused by the formation of hydrates, called "freezing," or due to collapse of the line. This particular invention is concerned primarily with the transportation of fluid in a pipe line wherein a high pressure exists in a portion of the line and a low pressure exists in another portion of the line. An example of such an installation is a line leading from a high pressure source, for instance, an oil or gas well, and containing a pressure reduction choke. Often the pressure upstream from the pressure reduction choke will be as high as from 500 p. s. i. to 800 p. s. i. and the pressure downstream from the pressure reduction choke may be only 15 p. s. i. to 30 p. s. i. In such instances, it is desirable to have the safety control device operate in response to pressure conditions downstream from the pressure reduction choke, but the control device itself preferably should be located in the high pressure portion of the line so as to protect the relatively light equipment of the low pressure portion of the system from the high pressures which would otherwise develop between the choke and the control device when shut. However, it is impractical to provide an actuator for closing the control device against high pressure, which is operated by the low pressure of the system.

An object of this invention is to provide a safety control device for a high pressure conduit which utilizes the high line pressure for shutting the device but is responsive to conditions in a low control pressure.

Another object is to provide a safety control device which may be installed in a pipe line having both high and low pressure portions in which the high pressure fluid actuates the device to shut off the line in response to pressure conditions existing in the low pressure portion of the line.

A further object is to provide in a safety control device having a high pressure actuator mechanism for closing the device, a controller having a large area pressure responsive member subjected to a low control pressure for holding the actuating mechanism against operation, which control pressure is vented, to operate the actuator mechanism, when the control pressure attains a predetermined value.

Still another object is to provide, as a subcombination, an actuator mechanism and controller therefor, of the character described, which may be employed in conjunction with a conventional valve.

A still further object is to provide, as a subcombination, a controller responsive to a low pressure and adapted for use in conjunction with a high pressure actuating mechanism.

Other and further objects of the invention will appear as the description proceeds.

In the accompanying drawings forming a part of the instant specification and wherein like reference numerals are used to designate like parts in the various views:

Fig. 1 is a vertical sectional view illustrating a safety control device embodying this invention; and Fig. 2 is a view taken along the line 2—2 in Fig. 1 in the direction of the arrows.

The safety control device may be considered generally as comprising a valve 5, an actuator mechanism 6 and a controller 7. The valve may be of any conventional make as, for example, the gate valve shown in the drawings. The actuator mechanism is motivated by pressure and is adapted to utilize the high pressure of the line controlled. Means may be provided in conjunction with the actuator for manual opening of the valve. The controller includes a pressure responsive means having a pressure responsive member subjected to a relatively low control pressure with a pilot valve adapted to vent the pressure from the pressure responsive member when this pressure attains a predetermined magnitude and this venting initiates the closing operation of the actuating mechanism.

The valve 5 is adapted to be connected in a pipe line. The pipe line may have interposed therein a section 8 containing a pressure reduction choke 9. The pipe line, not shown in the drawings, may be considered as communicating with a source of high pressure to the left of the valve as viewed in Fig. 1, and the portion of the pipe line to the right of the choke 9 will be a relatively low pressure conduit. The valve is connected to the high pressure portion of the pipe line, that is, to the left of the pressure reduction choke. The controller 7, if the control pressure is to be the pressure of the fluid in the low pressure portion of the line, may be connected to the conduit section 8 downstream of choke 9 by the conduit 10.

The valve 5 includes the usual body 11 with flange fittings 12 and 13 for securing it in a pipe line. The valve has a seat 14 in its interior cavity against which a valve member 15 is adapted to seat to shut off flow through the pipe line. The valve member 15 may be of the gate type as shown.

The actuator mechanism comprises a bonnet 16 mounted on the valve body by suitable fastening means 17. The interior of the bonnet is hollow providing a pressure chamber housing a pressure responsive member 18 which divides the pressure chamber into upper and lower compartments 19 and 20. The pressure responsive member may be a piston including an upper stem extension 21 having a large diameter lower portion providing a shoulder against which a retainer ring 22 seats. A piston packing 23 surrounds the stem and engages retainer ring 22. An expander ring 24 encircles the stem and engages the upper surface of piston packing 23. The piston assembly is held on the stem by a packing nut 25 threaded thereto.

The pressure responsive member has a drive connection with valve member 15 which may include any suitable linkage, as the lower stem 26 threaded to the upper stem and to the valve member.

A sealing means is provided between the lower stem and the bonnet so as to seal off the pressure chamber but to permit reciprocation of the lower stem. A suitable seal means utilizes the packing bushing 27 engaging the shoulder 28 internally of the bonnet to retain the sealing members 29 and expander rings 30. The assembly is held in place within the bonnet by bonnet gland nut 31 threaded thereto.

Motive fluid is supplied by suitable connections to both the upper and lower compartments 19 and 20 respectively. The preferred connections are formed in the upper and lower stems 21 and 26 as a central passage therethrough which communicates with the interior of the valve body through a passage 15a in the valve member. The central passage in the upper stem has a radial port communicating with the upper compartment, and the lower stem has radial ports communicating with the lower compartment. These latter ports are restricted as compared to the first port and are adapted to be sealed off as the pressure responsive member, upon energization, forces the lower stem downwardly to the extent that the ports pass the gland bushing 27.

The upper portion of the bonnet includes a mechanism providing for manual opening of the valve and also for a damping of the closing action of the valve. An upper or operating stem 32 is secured to the upper end of stem extension 21 and extends through a seal element 33 in the upper end of the bonnet. The free end of stem 32 is threaded to receive a hand part 34. A spacer 35, which is U-shaped in cross-section, may be placed on top of the bonnet about stem 32 and when in this position, rotation of hand part 34 in a direction to raise the stem will raise the valve member 15. A manually operated valve 36 is secured in an opening in the bonnet to control communication with the upper compartment 19 of the pressure responsive means so as to vent this compartment when it is desired to open the valve. This will facilitate manual operation and makes it possible to complete the last portion of the opening operation automatically after the radial ports in stem 26 rise above the packing ring 29.

The damping arrangement includes a cylinder 37 at the upper end of the bonnet in which an enlargement 32a on the upper stem is adapted to reciprocate. This enlargement has a fairly close tolerance with the inner surface of cylinder 37 so as to provide a dash-pot action resisting rapid movement of enlargement 32a in the cylinder. Cylinder 37 is packed off from the compartment 19 by a suitable packing arrangement housed within portion 38 of the bonnet. Preferably, the seal arrangement employs a plastic packing which may be injected through fitting 39. The dash-pot action is desirable to slow up the actuator mechanism when the valve is being shut to cushion the impact of the valve member 15 with the bottom of the valve which otherwise might damage the valve body or casing.

The controller 7 comprises a vent for compartment 20, controlled by a valve with a pressure responsive member controlling the vent and thereby the opening of the valve.

The vent includes an opening 40 in the bonnet which receives nipple 41, this joint being sealed by gasket 42. The end of the nipple which resides in opening 40 contains a seat gasket 43 held against a counterbore in the nipple by ring 44 and seat retainer nut 45, the latter being threaded to the nipple. A valve member 46 is adapted to engage seat 43 and ring 44 to control the vent but the pressure within the compartment urges the valve toward open position. The valve member may be the usual ball valve and is forced toward its seat by a pressure responsive means. The vent passage is completed by the bore through the nipple and the radial outlet port 48. The capacity of the vent passage, when open, is sufficiently greater than the capacity of the connection for supplying motive fluid to the lower pressure compartment to rapidly relieve the pressure in the compartment when open.

The pressure responsive means of the controller has an enclosed pressure responsive member 47 with a very large effective pressure area as compared to the cross-sectional area of the seat against which ball 46 is urged so that the force due to the low control pressure acting against it will exceed the opposing force due to the high pressure within compartment 20 acting against ball valve 46. This second pressure responsive member may be a diaphragm having its peripheral edge sealingly held in a two piece housing 49 and 50 secured together by suitable fastening means 51. The housing part 49 has a boss 52 threaded to the outer end of nipple 41. A central bore in the boss slidingly receives a pin 53 constituting a part of the linkage between the valve member 46 and the diaphragm 47. The remainder of the linkage includes a slide part 54 which is slidable in the central bore through nipple 41. This slide part 54 has enlarged guide portions which maintain the part in axial alignment within the bore. The left hand one of the enlargements, when the ball valve 46 is seated, covers port 48 but does not completely seal the same. Thus, when ball 46 is cracked from its seat, the pressure downstream from the ball rapidly builds up substantially to that of compartment 20 and acts against the enlarged pressure face of part 54 as a piston, to snap the pressure responsive means to the right assuring a snap action for valve member 46.

The pressure responsive means also has connections for supplying a control pressure to the side of diaphragm 47 remote from valve 46. This connection may be the conduit 10 which preferably contains a velocity check valve 55 adapted to close upon rapid flow of fluid through the conduit. The conduit communicates at its other end with a source of control pressure which is very low as compared to the pressure within the line controlled and which is utilized in the actuator mechanism. Where possible, it is preferred to use for this source of pressure the line pressure downstream from the pressure reduction choke 9. Thus, the controller for the actuator mechanism is responsive to a pressure condition of the controlled pressure on the low pressure portion of the pipe line. It is to be understood, however, that another source of control pressure, such as instrument pressure, may be used and in some instances, it is desirable to employ such a control pressure.

In order that the controller may be sensitive to a predetermined magnitude of the pressure to which the diaphragm 47 is exposed, the diaphragm housing part 50 is provided with a pilot relief valve adapted to open when the pressure within the housing 50 attains some predetermined magnitude. Preferably, it is desirable to employ pilot valves sensitive to both an upper and a lower limit. The pilot valves disclosed in my co-pending application for United States Letters Patent covering "Pressure Relief Valve," Serial Number 726,375, filed February 4, 1947, and now abandoned, the claims of which application were transferred to my co-pending application Serial Number 726,373, filed February 4, 1947, and issued as United States Letters Patent 2,566,772 on September 4, 1951. The details of construction of the pilot valves shown in this patent are preferred for this use and are fully disclosed in that patent.

The pilot valves are secured to the housing 50 by a fitting 56 threaded to a boss 57 on the housing. This fitting may have an axial passage extending through it to threadingly receive a lock pin 58. The outer end of the pin has a non-circular head for receiving a wrench so that the pin may be advanced to a position to prevent opening movement of diaphragm 47. A seal such as O-ring 59 permits movement of the pin but prevents leakage past the pin.

The details of the pilot valves will not be described herein because of the complete description in my co-pending application. Each of these pilot valves are adapted to open with a snap action, with valve 60 being sensitive to a low pressure so as to open and vent housing 50 when the pressure within the housing drops below a predetermined magnitude. Valve 61 is sensitive to a high pressure and is adapted to open with a snap action to relieve the pressure within housing 50 and when the pressure therein exceeds a predetermined maximum. The sensitivity and positive snap action opening of the valves disclosed in my said co-pending application make it desirable to employ pilot valves of this construction in this controller.

In describing the operation, it will be assumed that the safety control device is installed in a pipe line conducting fluid from a high pressure well into a gathering line operating at a relatively very low pressure compared to the pressure of the fluid leaving the well. Such installations are common wherein pressures of the fluid leaving the well may be as high as 800 p. s. i. and the pressure within the gathering line of the order of 15 p. s. i. to 30 p. s. i. The pressure reduction takes place across the choke 9. Because of the low operating pressures within the portion of the pipe line below the choke, it is the preferred practice to close the line in the event of an emergency at a point above the pressure reduction choke because the downstream portion of the line usually is not constructed to withstand the high pressures which would develop when the control device is closed. On the other hand, it is impossible to close the device, with an actuator of practical size and cost, against the high line pressure when utilizing the low line pressure for driving the actuating mechanism.

It will be understood that in operating a line of this character there is always the possibility of a break in the line downstream from the safety control device, and when this occurs, the pressure downstream from the choke 9 will drop. Also, there is the possibility of the line being plugged downstream from the choke either by the formation of hydrates, commonly called "freezing," or due to collapse because of damage by a heavy object such as a truck wheel, tractor wheel or other heavy equipment. In the event of such closing off, the pressure within the line downstream from the choke will build up and in time would equal the line pressure upstream of the choke. This high pressure is dangerous when existing in the low pressure portion of the system.

The safety control device of this invention operates to positively close the line upstream from the low pressure portion in the event of either of these emergencies or it is contemplated that the controller may be made responsive to a control pressure other than line pressure as, for instance, instrument pressure which is nearly always available around drilling rigs and the like. In the latter case, in the event of an emergency, the operator cuts off the instrument pressure which lowers the pressure within the pressure responsive means of the controller causing the low pressure pilot to open whereupon the actuating mechanism 6 shuts the valve 5.

It is believed that the operation of the actuating mechanism is apparent from the foregoing description. With the ball valve 46 closed, the pressure responsive member 18 of the actuator is in a balanced pressure condition and the valve member 15 remains open. However, upon occurrence of a predetermined pressure condition within housing 50 of the controller, the pilot valve sensitive to the prevailing condition will open to vent the controlled pressure from housing 50. The vents controlled by the pilot valves should each be of sufficient capacity to rapidly relieve pressure within housing 50 when they are open.

The use of the velocity check valve 55 in the conduit 10 makes it possible to utilize smaller vents because it will close when rapid rate of flow takes place through the conduit upon opening of either of the vents. An even more important function of the velocity check valve is the prevention of loss of control fluid to the atmosphere when either of the pilot valves is open.

The controller functions to unbalance the pressure across pressure responsive member 18 of the actuator mechanism by venting compartment 20, to effect closing of valve member 15. This results from the venting of pressure in housing 50 so that the force due to pressure against diaphragm 47, tending to urge ball valve 46 against its seat through the linkage including pin 53 and part 54 immediately falls off and the pressure of the fluid within compartment 20 urges ball valve 46 toward open position. This opening of the ball valve is with a snap action because immediately upon cracking of the ball valve from its seat, the pressure builds up downstream thereof and acts against the left hand face of the left enlargement on the end of guide part 54, as viewed in Fig. 1. The area of the guide 54 exposed to the pressure substantially that of compartment 20 is greater than the area of the valve member so the force against the diaphragm member 47 increases to rapidly drive it to the right as viewed in Fig. 1. This permits ball valve 46 to drop from its seat to complete the vent opening including outlet port 48.

The capacity of the vent for compartment 20 is purposely constructed to materially exceed the capacity of the radial ports in stem 26 which supply pressure fluid to compartment 20. Thus, with the ball valve open, the pressure in compartment 20 is rapidly relieved and the pressure in compartment 19 forces the pressure responsive member 18 downwardly to close the valve.

Due to the high pressure of the motive fluid for the actuator, it is desirable to slow down the closing of the valve to prevent excessive hammering of valve member 15 against the bottom of the valve body. The enlargement 32a on upper step 32, operating in the sealed cylinder 37, provides a dash-pot action absorbing much of the shock of closing.

To open the valve, the pilot valves 60 and 61 are shut in the manner completely disclosed in my said co-pending application and the lock is set to close valve 46. Valve 36 is opened to relieve the pressure within compartment 19. The handle 34 is backed off to the end of stem 32 and spacer 35 is placed on the upper end of the bonnet surrounding stem 32. Handle 34 is then rotated in a directional sense to cause it to engage the upper end of the spacer. Upon contact therewith, continued rotation of the handle causes stem 32 to rise due to the threaded connection between the handle and the stem. This raises stem extension 21 and link or stem 26 to open the valve. As soon as the pressure connection for supplying pressure to compartment 20 is exposed above the lower bonnet packing assembly, the pressure builds up in compartment 20 and will aid the opening action.

If control pressure such as instrument pressure is employed in the controller, it is not necessary to set lock pin 58 to close ball valve 46 for the pressure can be supplied to housing 50 to accomplish this. However, where the control pressure is the downstream line pressure, this pressure often will have fallen off when the safety device is closed. However, it will quickly build up when the safety device is open, and when it has built up, lock pin 58 is backed off so that the controller is ready for operation.

The control device of this invention differs from that disclosed in my co-pending application for United States Letters Patent, Serial Number 69,870, filed January 8, 1949, for "Safety Flow Control Device" issued as United States Letters Patent 2,566,776 on September 4, 1951, for in that application the choke or flow restrictor 7 is adapted to create only a small pressure reduction and the arrangement there shown operates very satisfactorily. However, where a great pressure differential exists across the choke, the control device of this invention is used.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In combination a flow line for conducting fluid from a high pressure source, a pressure reduction choke in the line providing a restriction of a predetermined size independent of the pressure in said line and adapted to reduce the pressure downstream thereof to a substantially lower value, a valve including a seat and seating element disposed in the line upstream of the choke, a fluid driven actuator mechanism having a chamber to be vented for closing the valve, connections for supplying high pressure motive fluid from said line upstream of said choke to the actuator mechanism, and a controller for the actuator mechanism comprising a differential area pressure responsive means for controlling the venting of said actuator chamber including a valve member controlling a vent port for said actuator chamber, a first area exposed to pressure upstream of said choke to urge the valve member to venting position and a second area of greater magnitude and effectively opposing said first area, the second area exposed to pressure downstream of the choke to urge said valve member to non-venting position, and pilot valve means for relieving pressure on said second area responsive to the occurrence of a predetermined pressure downstream of said choke.

2. The combination of claim 1 wherein the pilot valve means is responsive to a low pressure limit.

3. The combination of claim 1 wherein the pilot valve means is responsive to a high pressure limit.

4. In combination a flow line for conducting fluid from a high pressure source, a pressure reduction choke in the line providing a restriction of a predetermined size independent of the pressure in said line and adapted to reduce the pressure downstream thereof to a lower value, a valve disposed in the line upstream of the choke, an actuator for shutting the valve including a system with a pressure responsive member having a drive connection with the valve, connections for supplying high pressure fluid from the line from upstream of the choke to the system on both sides of the pressure responsive member, a vent for relieving the pressure on one side of the pressure responsive member, a valve member controlling the vent and urged toward open position by the pressure to be vented, a pressure responsive means including a second pressure responsive member with an effective pressure area larger than the area of the valve member exposed to the pressure to be vented, a connection between the second pressure responsive member and valve member such that pressure acting on said area of said pressure responsive member effectively opposes the pressure to be vented acting on said area of the last mentioned valve member, means for pressurizing the second pressure responsive member with a control pressure so as to hold the valve member seated, and a pilot valve responsive to the control pressure for venting the pressure from the second pressure responsive means when the pressure exerted against the second pressure responsive member reaches a predetermined value.

5. The combination of claim 4 wherein the pilot valve is responsive to a low pressure limit.

6. The combination of claim 4 wherein the pilot valve is responsive to a high pressure limit.

7. The combination of claim 4 wherein the control pressure is the line pressure downstream of the choke.

8. The combination of claim 4 wherein the second pressure responsive member is a diaphragm.

9. The combination of claim 4 wherein the means for pressurizing the second pressure responsive member includes a conduit with a velocity check valve therein.

10. As a subcombination a valve body part providing a system with a pressure responsive member adapted to be connected to a valve to actuate it, means including connections for supplying pressure fluid to the system on each side of the pressure responsive member, a vent for the system to relieve the pressure from one side of the pressure responsive member, a valve member controlling the vent and urged toward open position by the pressure to be vented, a controller for holding the valve member shut including a pressure responsive means having a second pressure responsive member with an effective pressure area larger than the area of the valve member exposed to the pressure to be vented, a linkage connected between the valve member and the second pressure responsive member, a connection for supplying pressure to the one side of the second pressure responsive member to urge it in valve shutting direction, and a pilot valve for relieving the pressure against said side of the second pressure responsive member when such pressure attains a predetermined magnitude.

11. The subcombination of claim 10 wherein the pressure system of the valve body part has a cylinder, the pressure responsive member is a piston operable therein and mounted on an actuating stem, and connections for pressurizing the compartments includes passages formed in the stem.

12. The combination of claim 10 wherein the pilot valve is responsive to a low pressure limit.

13. The combination of claim 10 wherein the pilot valve is responsive to a high pressure limit.

14. The combination of claim 10 wherein the second pressure responsive member is a diaphragm.

15. The combination of claim 10 wherein the means for pressurizing the second pressure responsive member includes a conduit with a velocity check valve therein.

16. In combination a flow line adapted to be connected to a high pressure source, a pressure reduction choke in the line to reduce the pressure to a lower value downstream thereof, a valve including a valve member and seat separate from said choke and disposed in the line upstream of the choke, an actuator for shutting the valve including a system with a first pressure responsive member having a drive connection with the valve, a connection for supplying high pressure fluid from the line upstream of the choke to both sides of said first pressure responsive member, a vent for relieving the pressure on one side of said first pressure responsive member, a second valve member controlling the vent and urged toward open position by the pressure to be vented, a pressure responsive means including a second pressure responsive member, a connection between the second pressure responsive member and said second valve member, means for pressurizing said second pressure responsive member with a control pressure from some point in the flow line downstream from the choke so as to hold said second valve member seated, the effective pressure area of said second pressure responsive member holding said second valve member seated being sufficiently larger than the area of said second valve member exposed to the pressure to be vented that the substantially lower pressure downstream of said choke can prevent venting of one side of said first pressure responsive member, and a pilot valve responsive to said control pressure for venting the control pressure from said pressure responsive means when said control pressure reaches a predetermined value.

17. As a subcombination a valve body part providing a system with a pressure responsive member adapted to be connected to a valve to actuate it, means including connections for supplying pressure fluid to the system on each side of the pressure responsive member, a vent for the system to relieve the pressure from one side of the pressure responsive member, a valve member controlling the vent and urged toward open position by the pressure to be vented, a controller for holding the valve member shut including a pressure responsive means having a second pressure responsive member with an effective pressure area larger than the area of the valve member exposed to the pressure to be vented, a linkage connected between the valve member and the second pressure responsive member, a connection for supplying pressure to the one side of the second pressure responsive member to urge it in valve shutting direction, and a pilot valve adapted to be selectively opened for relieving the pressure against said side of the second pressure responsive member.

References Cited in the file of this patent

UNITED STATES PATENTS

| Number | Name | Date |
|---|---|---|
| 398,111 | Abbot | Feb. 19, 1889 |
| 901,222 | Anderson | Oct. 13, 1908 |
| 967,702 | Anderson | Aug. 16, 1910 |
| 1,319,154 | Johnson | Oct. 21, 1919 |
| 1,892,565 | Browne | Dec. 27, 1932 |
| 2,262,539 | Shafer | Nov. 11, 1941 |
| 2,351,874 | Parker | June 20, 1944 |
| 2,520,111 | Bennett | Aug. 29, 1950 |
| 2,556,829 | Teague | June 21, 1951 |
| 2,569,285 | Brown | Sept. 25, 1951 |